United States Patent [19]

Stites

[11] Patent Number: 5,199,929

[45] Date of Patent: Apr. 6, 1993

[54] AUTOMATIC BICYCLE TRANSMISSION

[76] Inventor: William J. Stites, 47-18 Skillman Ave., Sunnyside, N.Y. 11104

[21] Appl. No.: 509,974

[22] Filed: Apr. 16, 1990

[51] Int. Cl.$^5$ .............................................. F16H 9/10
[52] U.S. Cl. ...................................... 474/54; 474/70; 474/123
[58] Field of Search ................... 474/2, 3, 47, 49, 50, 474/54, 58, 70, 71, 114; 180/230, 231, 220; 280/210, 212, 214, 215, 261; 318/6

[56] References Cited

U.S. PATENT DOCUMENTS

| | | | |
|---|---|---|---|
| 3,991,843 | 11/1976 | Davidson | 180/220 X |
| 4,041,788 | 8/1977 | Nininger, Jr. | 474/80 |
| 4,061,046 | 12/1977 | Lang | 474/70 |
| 4,122,907 | 10/1978 | Davidson et al. | 280/214 X |
| 4,325,702 | 4/1982 | Jacobsson et al. | 474/56 |
| 4,342,559 | 8/1982 | Williams | 474/50 |
| 4,373,926 | 2/1983 | Fullerton | 474/57 |
| 4,457,739 | 7/1984 | Iseman | 474/49 |
| 4,490,127 | 12/1984 | Matsumoto et al. | 474/110 |
| 4,605,240 | 8/1986 | Clem et al. | 280/236 |
| 4,634,406 | 1/1987 | Hufschmid | 474/49 |
| 4,713,042 | 12/1987 | Imhoff | 474/70 X |
| 4,741,546 | 5/1988 | Reswick | 280/236 |
| 4,744,577 | 5/1988 | Brent et al. | 280/215 |

OTHER PUBLICATIONS

Popular Science; Dec. 1988; Reference cited of similar concept as applied to automotive technology.

Primary Examiner—Ramon S. Britts
Assistant Examiner—Roger J. Schoeppel

[57] ABSTRACT

An electronic, automatic bicycle transmission that compensates gear ratios according to changes in pedaling pressure and pedaling speed.

A drive belt rides upon smooth, cone shaped surfaces at the pedals and rear wheel. Placement of the belt upon the cones is controlled by two roller guides. Speed and pressure sensors located in the front roller guide monitor tension and movement of the drive belt.

The belt speed and pressure information is inputed to a central processing unit. If the values of these parameters fall outside predetermined limits, the central processing unit activates reversible electric motors to move the two roller guides. This changes the location of the belt on the cones, thus altering the apparent diameters and resulting in a more desirable gear ratio. The parameters of pedaling pressure and pedaling speed are then restored to within their predetermined comfort ranges.

20 Claims, 9 Drawing Sheets

AUTOMATIC BICYCLE TRANSMISSION

FIELD OF INVENTION

This invention relates to bicycles, specifically to an improved mechanism for automatically changing gear ratios for pedaling.

The purpose of changing gear ratios is to allow a selectivity of the most efficient gear ratio to maximize work output and minimize fatigue. As a bicycle rider experiences varying resistances during riding, the most efficient gear ratio may change. For example, when beginning a ride the most efficient gear ratio is relatively low, and generally increases with speed. The primary purpose of this invention is to create a more efficient human powered vehicle.

PRIOR ART

Several references are cited herein which represent the total of the prior art to the best of the author's knowledge.

U.S. Pat. No. 4,605,240 to Clem et al. (1986) shows an automatically shifting mechanism that senses wheel speed and overall bicycle orientation. The heart of the system is a micro-computer that inputs the wheel speed and bicycle orientation data to determine the appropriate gear ratio. It then proceeds to actuate a motor drive attached to a gear shifting mechanism in order to achieve the desired gear ratio.

U.S. Pat. No. 4,490,127 to Matsumoto et al. (1984) shows a system similar to Clem et al. A micro-computer inputs wheel speed, pedaling speed, present gear shifting position, age of the rider, gender of the rider, and topography of the riding surface. Here again, a motor drive is actuated to achieve the calculated gear ratio.

U.S. Pat. No. 4,061,046 to Lang (1977) shows a mechanism where foot pressure is monitored via hydraulic or electric means. The pedal apparatus is directly linked to the gear shifting apparatus without any intervening processing by a micro-computer or otherwise.

U.S. Pat. No. 4,041,788 to Nininger, Jr. (1977) shows an electric shifting mechanism which serves to facilitate the manual gear shifting process. Here, the rider still needs to manually and consciously select the gear ratio and when to shift.

The following references will be described as a group due to their high structural and functional similarity: U.S. Pat. Nos. 4,741,546 to Reswick (1988); 4,634,406 to Hufschmid (1987); 4,373,926 to Fullerton (1983); 4,342,559 to Williams (1982); and 4,325,702 to Jacobsson et al. (1982). The common concept here is a variable diameter pulley that carries a drive chain or belt. The pulley is usually, but not exclusively, located at the pedal crank of the bicycle. The pulleys have spring-loaded segments that compress in response to increased pedaling pressure, as in riding uphill. This compression reduces the apparent diameter of the pulley and lowers When the pedaling pressure decreases, as in riding downhill, the spring-loaded pulley expands, resulting in an increase in the gear ratio and firmer pedaling.

Upon review of the above citations, the following disadvantages become apparent.

U.S. Pat. Nos. 4,605,240 to Clem et al. and 4,490,127 to Matsumoto et al. are highly complex. Each system requires detailed input in order to operate accurately. Clem will have the rider attach special programs to the micro-computer to accommodate different riding conditions and individual rider styles; Matsumoto will have the rider input age, gender, and road topography before beginning a ride. Obviously, an invention that doesn't require any conscious input from the rider would be preferred. All of this input data necessitates complicated integration and processing via a micro-computer. Also, this complexity adds to the retail price and maintenance costs to the consumer.

U.S. Pat. No. 4,061,046 to Lang monitors foot or pedaling pressure. The pressure monitoring apparatus is linked directly to the shifting mechanism. Although this is a simpler concept in that only foot pressure is monitored, its application turns out to be mechanically complex and operationally impractical. The preferred embodiment, as illustrated by Lang, shows the need for a sealed hydraulic system within the pedals and frame of the bicycle. This would present a large burden for bicycle manufacturers. In essence, the producer of this mechanism would need to build a bicycle around it. Certainly, an invention that requires little or no change to the existing bicycle hardware would be preferred.

The practicality of operation for Lang's invention is also seriously questioned. The normal fluctuations in each pedal's pressure during cycling may wreak havoc to the shifting mechanism, depending on its sensitivity. In addition, bicycle riders occasionally leave their seat and stand on the pedals. Here, the body weight of the rider has an inordinately large influence on gear selection. At the other extreme, during coasting there is very little pressure on the pedals so that the gear shifter would tend to upshift. Although an inactivation switch is included in Lang's design, the rider would have to flip the switch every time he/she stopped pedaling, and then again upon resuming pedaling.

U.S. Pat. No. 4,041,788 to Nininger, Jr. is simply not an automatic gear shifter. The timing and selection of the gear ratio is still determined manually by the rider. The advantage of smoother shifting is countered by the disadvantages of complexity and high cost. This patent is cited as a related reference albeit the purpose of my invention is full automation of the gear shifting process.

The above mentioned prior art has been created for the purpose of automating the existing gear-shifting system commonly seen on today's 10-speed bicycles. This system is appropriately named a "derailleur" as it derails a drive chain from one sprocket and places it on to another. Although the number of sprockets may vary, the typical 10-speed has 5 sprockets at the rear wheel and 2 sprockets at the pedals. A significant limitation of this prior art is that the automation is applied to the rear wheel only. This limits the gear ratio selections to the number of rear wheel sprockets. Thus, after automation we find ourselves with 5-speed bicycles.

A second and very significant disadvantage of all four of the above is a loss of forward propulsion during gear ratio changes.

The group of U.S. patents comprising 4,741,546 to Reswick (1988); 4,634,406 to Hufschmid (1987); 4,373,926 to Fullerton (1983); 4,342,559 to Williams (1982); and 4,325,702 to Jacobsson et al (1982); has several flaws. The complexity and number of parts adds to the cost of production, weight to the bicycle, and susceptibility to mechanical failure. Also, there is much wasted energy in that a significant portion of the rider's pedaling force is usurped to keep the pulleys contracted in equilibrium against the expansile forces of the springs. Not only is energy wasted during riding, but every time the rider stops pedaling, the pulley expands maximally and the rider must use energy to overcome this when resuming pedaling.

Furthermore, in most cases of the above group the variable diameter pulleys are applied only to the pedal crank. This limitation is akin to the rear-wheel-only applications of Clem, Matsumoto, Lang, and Nininger, Jr. where overall gear ratio range becomes more limited upon automation. Ideally, an invention that can apply automation to both the pedal crank and the rear wheel will be able to grant access to a wider range of gear ratios.

OBJECTS AND ADVANTAGES

As we have seen, there are basically two schools of thought in regard to changing gear ratios for bicycles. First, one may select from several fixed diameter surfaces upon which a chain or belt is placed; second, there may be a single location for the chain or belt where the diameter is variable.

My invention is essentially a hybrid of the above two schools in that there is selective placement of a drive belt upon a single cone-shaped surface offering many diameters. This structure accomplishes several important advantages over the prior art.

1) An infinite number of gear ratios are available with my invention. This is accomplished by the use of a belt instead of a chain, which rides on smooth cone-shaped surfaces, rather than on sprockets. These cone shapes permit an infinite number of belt locations within the outer limits.

2) Cone shapes are used at both the rear wheel and the pedals. Their shapes resemble the silhouettes of the grouping of sprockets as seen on today's 10-speed bicycles. In this way, my invention shares similar outer limits for the range of gear ratios with today's manual 10-speed systems. Since the automation of my invention is applied to both the rear wheel and the pedal crank, the gear ratio range limits of the prior art systems are greatly surpassed.

3) My invention is simple. Since our purpose is to maximize the comfort and efficiency to the rider, we are only interested in what the rider is experiencing directly. The very minimum of information is inputed to a central processing unit, which is pedaling pressure and pedaling speed. This invention eliminates all waste by utilizing the simplest and most direct feedback loop between the rider and the shifting mechanism. There is no need to monitor absolute bicycle speed, bicycle orientation, present gear ratio, rider age, rider sex, road topography, etc.

4) There is no need for the rider to be cognitive in gear selection. The rider never needs to select or otherwise input as to when or to which gear the shifting should occur.

5) Many riding levels, from beginner to professional, can be accommodated. If the rider is unsatisfied with the present settings, he/she may voluntarily raise or lower the desired riding intensity by inputing this information to the central processing unit via a hand control mounted on the handlebars. Such a hand control would also afford the capability to manually override the automation, and include an on/off switch.

6) The weight of my invention is relatively low. In fact, it is lighter than the existing manual 10-speed system because we are replacing many metal parts with lighter plastic parts.

7) The structure of my invention is independent of the frame of the bicycle so that no modification to the bicycle frame is necessary. This greatly expands the applicability of my invention and minimizes adaptation costs for applying it to today's bicycles. In fact, a kit can be made available for replacing an individual's existing derailleur system on 10-speed bicycles.

8) A very small amount of the rider's energy is used or dissipated by this invention. The bulk of the energy that is used is actually harnessed by a small generator for constantly refreshing the system's power cell.

9) The overall simplicity keeps production costs down.

Further objects and advantages will become apparent from consideration of the drawings and the ensuing description.

LIST OF REFERENCE NUMERALS

| | | | |
|---|---|---|---|
| 20 | drive belt | 48B | rear rack and pinion mechanism (twisting) |
| 22 | tangential line | | |
| 30 | front cone shaped surface | 49 | bevel and disc gear mechanism |
| 32 | rear cone shaped surface | | |
| 40 | front belt guide | 50 | rear belt guide |
| 41A | belt roller of front guide | 54 | roller support arm |
| 41B | front belt roller of rear guide | 60 | front guide rider bar |
| 41C | rear belt roller of rear guide | 62 | rear guide rider bar |
| 42 | pressure sensor | 64 | stabilizing wheels |
| 43 | speed sensor | 66 | groove for stabilizing wheels |
| 44 | central processing unit | 70 | manual control |
| 45A | reversible motor of front guide | 72 | lever of manual control |
| 45B | reversible motor of rear guide | 74 | on/off switch |
| 46 | power cell | 80,82 | mounting hardware |
| 47 | generator | 90,92 | connecting wires |
| 48A | front rack and pinion mechanism | | |

DESCRIPTION OF INVENTION

The visible structure of this invention comprises:

I) a drive belt (20),

II) front and rear cone shaped surfaces (30,32) for carrying the belt,

III) front and rear belt guides (40,50),

IV) front and rear guide rider bars (60,62),
V) a manual control (70),
VI) mounting hardware (80,82), to support the guide rider bars, and
VII) two wires, one (90) connecting the central processing unit to the rear belt guide, and the other (92) connecting the central processing unit to the manual control.

The front belt guide (40) comprises:
a) belt roller (41A),
b) pressure sensor (42),
c) speed sensor (43),
d) central processing unit (44),
e) reversible motor (45A),
f) power cell (46),
g) generator (47), and
h) a rack and pinion mechanism (48A),
i) bevel and disc gear mechanism (49).

The rear belt guide (50) comprises:
a) two belt rollers (41B,41C),
b) roller support arm (54),
c) a reversible electric motor (45B), and
d) a rack and pinion mechanism (48B).

Figure 1:
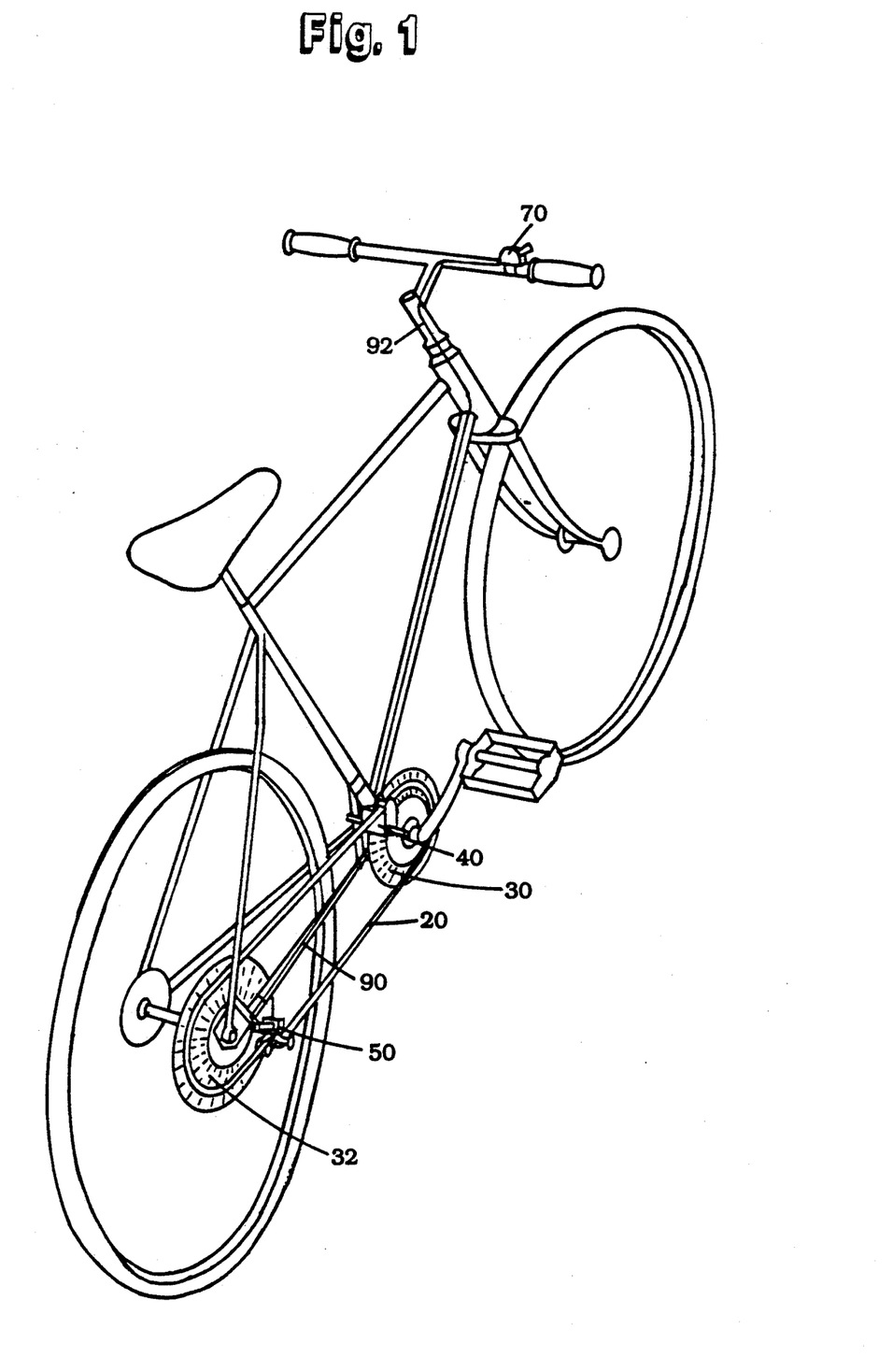
FIG. 1 is a perspective drawing of a bicycle equipped with my invention.
Figure 3:
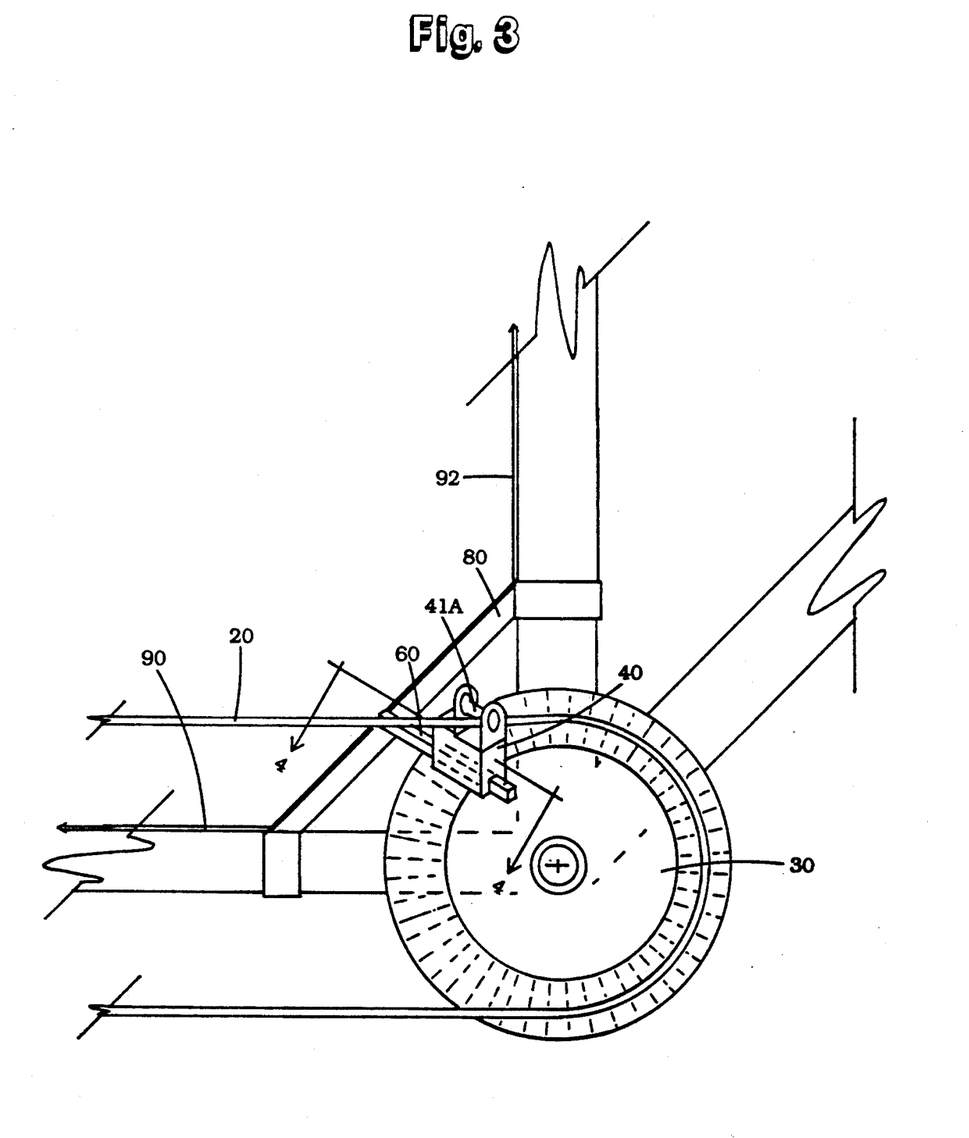
FIG. 3 shows the right side view of the pedal crank apparatus.
Figure 6:
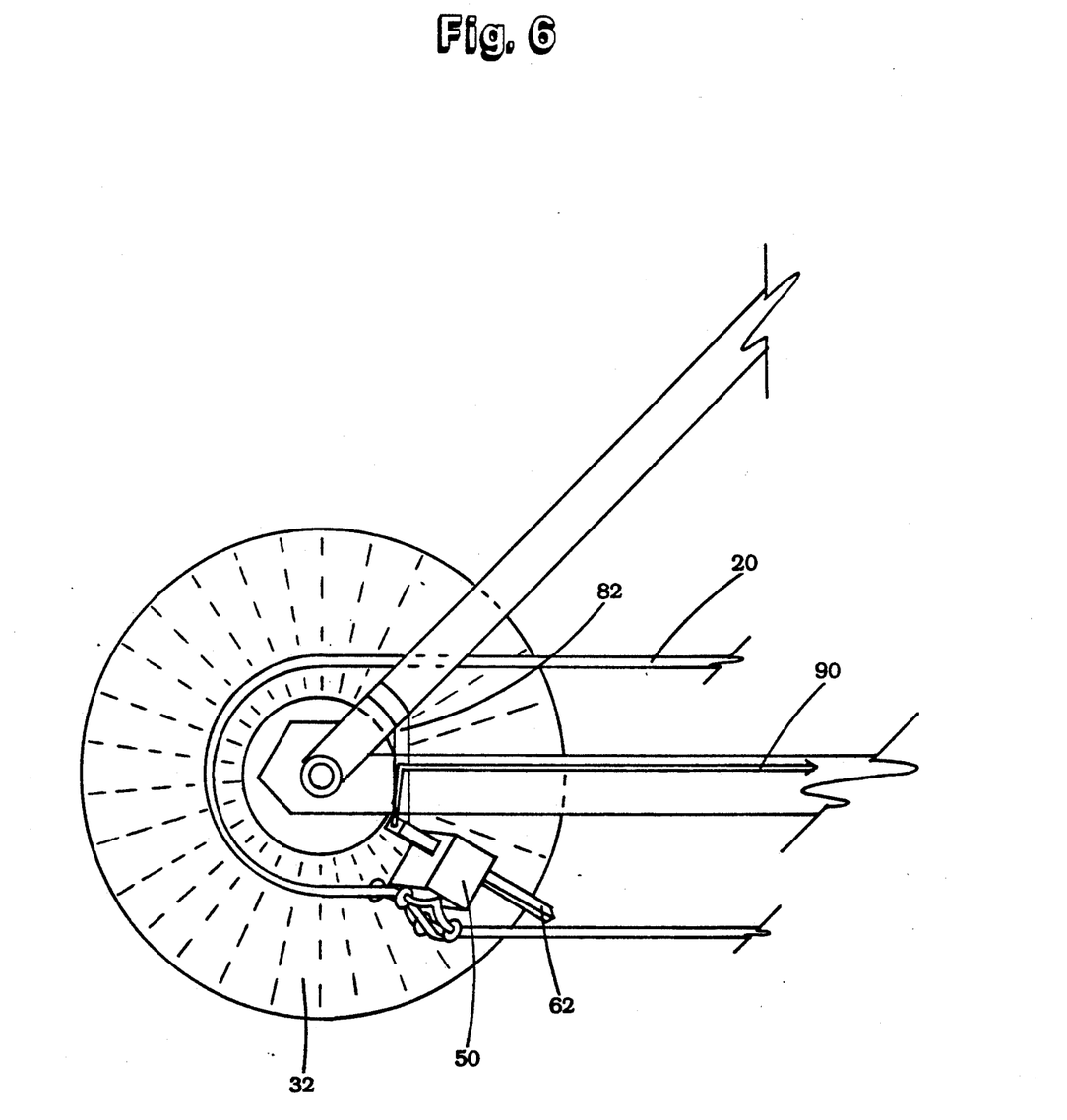
FIG. 6 shows the right side view of the rear wheel apparatus.

FIG. 1 shows the belt guides (40,50) as they function to direct the drive belt (20) onto the cones (30,32) and guide its placement. By varying belt placement on the cones (30,32), one can induce changes of apparent diameter for the belt (20). The guides (40,50) are affixed to the guide rider bars (60,62) and can move along the long axes of these bars. [see FIGS. 3,6] The bars are attached to the bicycle frame via mounting hardware (80,82). Each bar (60,62) is angled downward at the same angle as the cone surfaces, so that there is consistent belt placement along all locations of the cones (30,32).

Figure 4:
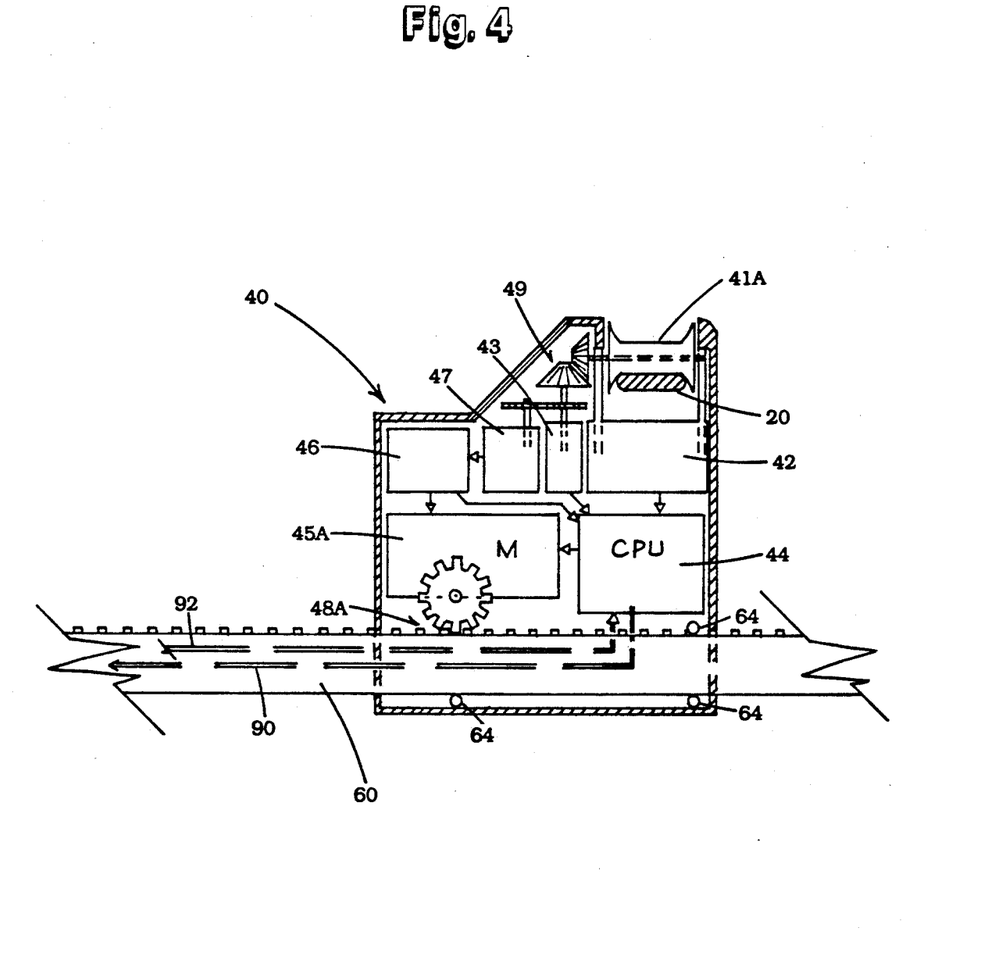
FIG. 4 shows the cross section of the front belt guide indicated by the section lines 4—4 in FIG. 3.
Figure 5:
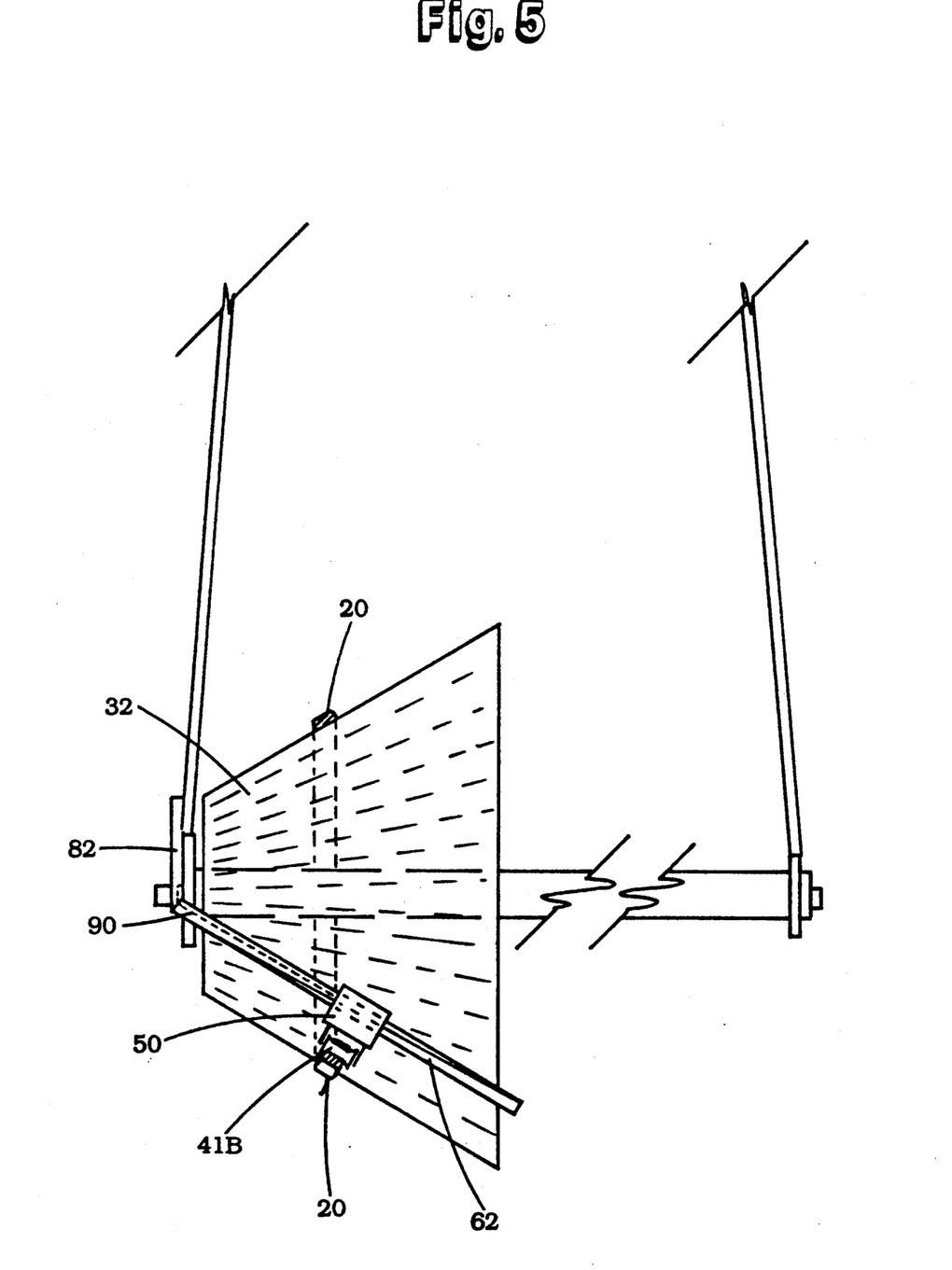
FIG. 5 shows the front view of the rear wheel apparatus.

FIG. 4 illustrates a cross-section of the front guide (40). The pressure sensor (42) is linked directly to the ends of the axle of the roller (41A); the speed sensor (43) and generator (47) are linked directly to the roller (41A) via a bevel and disc gear mechanism (49). The sensors (42,43) input to the central processing unit (44), which outputs control to the reversible motors (45A,45B) of each guide. The power cell (46) supplies power to both reversible motors (45A,45B), and is constantly recharged by the generator (47) during pedaling.

The two reversible electric motors (45A,45B) each drive rack and pinion mechanisms (48A,48B) that function to move the front and rear belt guides (40,50) linearly along the long axes of their respective guide rider bars (60,62).

Figure 7:
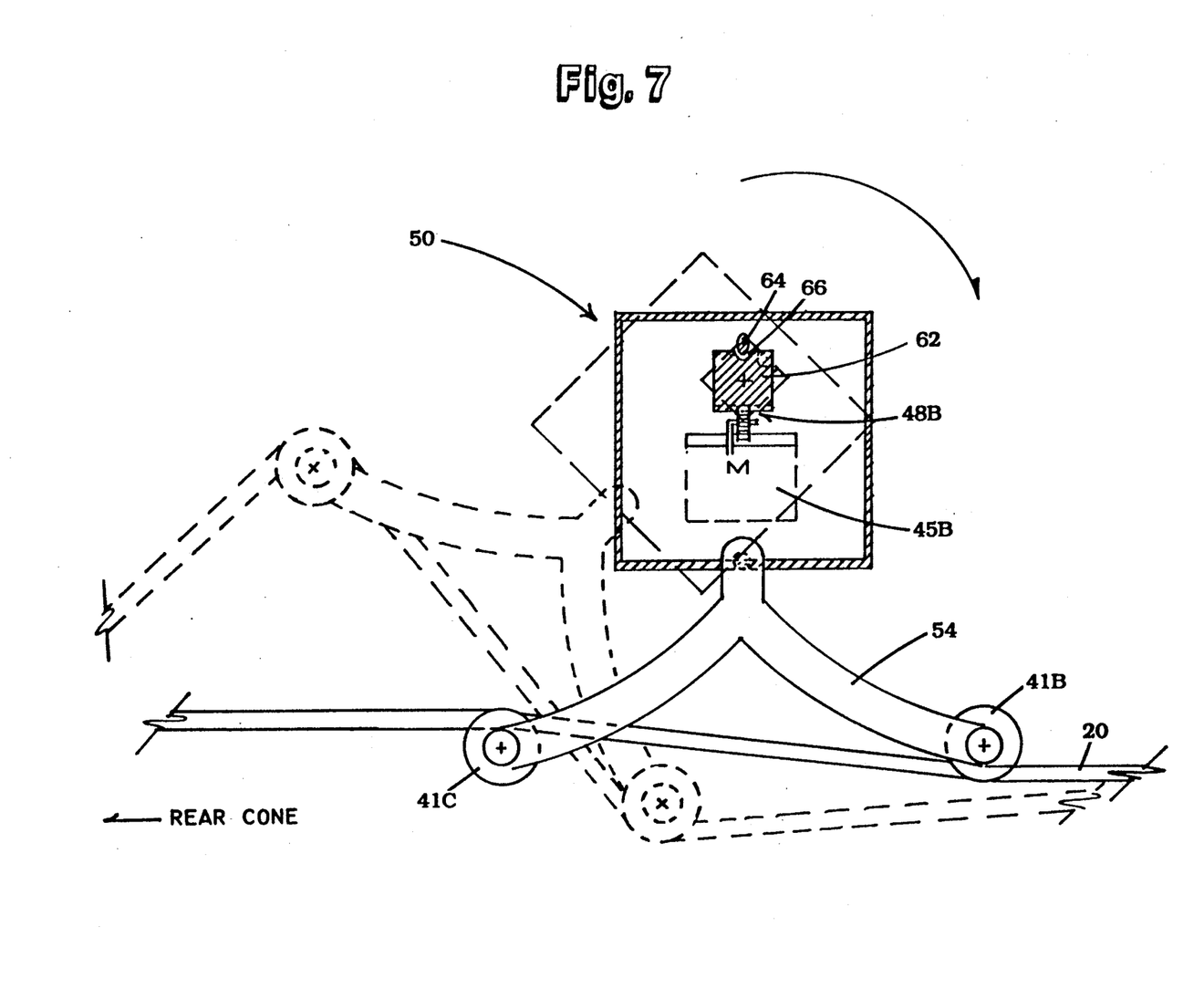
FIG. 7 shows a cross section of the right side view of the rear belt guide, with its tendency to rotate clockwise as it moves toward the viewer.
Figure 8:
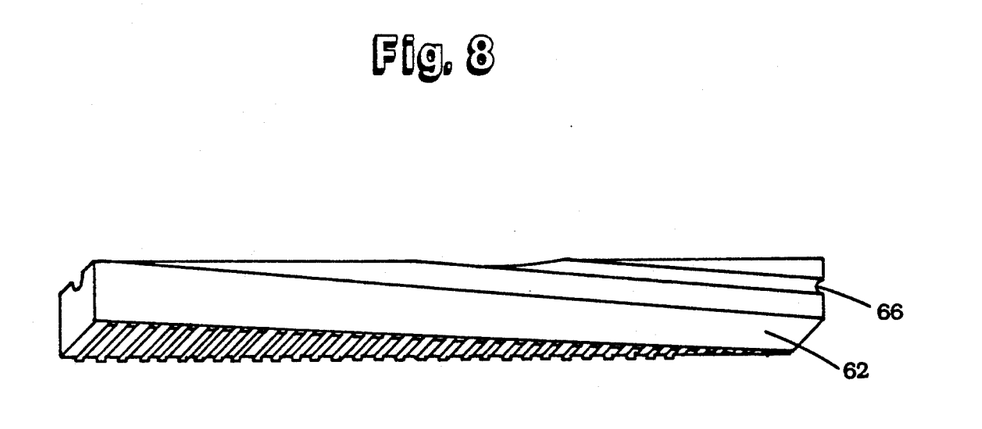
FIG. 8 shows a perspective view of the rear guide rider bar.

FIG. 7 shows a cross-section of the right side view of the rear guide (50). The two rollers (41B,41C) are mounted and spaced on the roller support arm (54) in such a way as to take up belt slack. The guide rider bar (62) is twisted along its long axis so that as the guide (50) moves out toward the narrower portion of the cone, it is also rotated clockwise. [see FIGS. 7,8] This rotation sufficiently takes up the slack created upon higher gear ratios. The roller support arm (54) on the rear guide (50) that holds the two rollers (41B,41C) is hinged and springloaded to consistently maintain a small degree of tension on the belt (20). This arrangement also serves to maximize the belt contact with the rear cone (32). The front of the two rollers (41B) contacts the superior surface of the belt (20); the rear of the two rollers (41C) contacts the inferior surface of the belt (20).

A wire (90) runs from the central processing unit (44) in the front guide (40) to the rear guide (50). This wire (90) contains electric power and information to control the reversible electric motor (45B) in the rear guide (50). In this way, the front and rear guides (40,50) move in exact synchrony.

Figure 10:
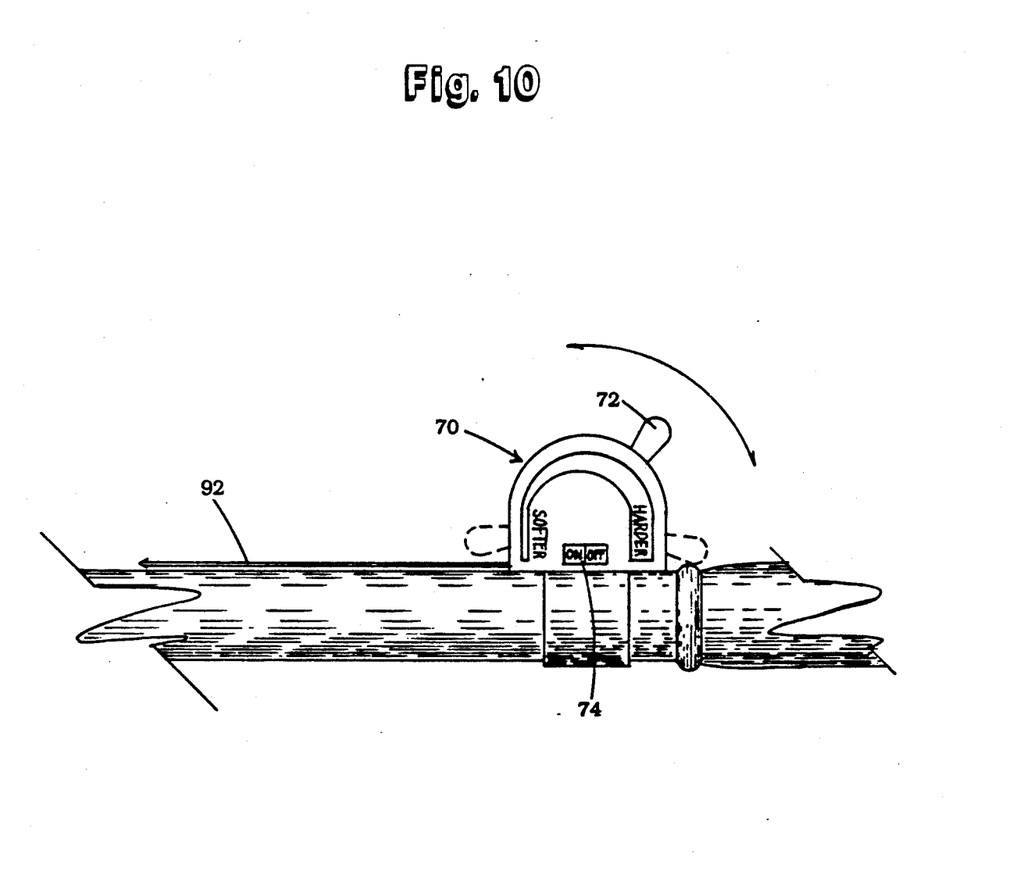
FIG. 10 shows the top view of the manual control mounted on the right handlebar.

A second wire (92) runs from a manual control (70) to the central processing unit (44). [see FIG. 10] This control (70) provides a rider with the option to influence the system's function according to his/her personal preference. In this way, this system will accommodate all levels of riding skills from beginner to professional.

OPERATION OF INVENTION

The operation of this invention is based on a fairly simple feedback loop not unlike typical home heating systems that use thermostats. The status of the rider is constantly monitored with regard to pedaling speed and pedaling pressure. This information is used to trigger gear ratio changes whenever the values of the pedaling speed and pressure fall outside predetermined limits. These limits define a range which is heretofore called the "comfort range", and is analogous to the range of temperature within which a home is kept.

Figure 2:
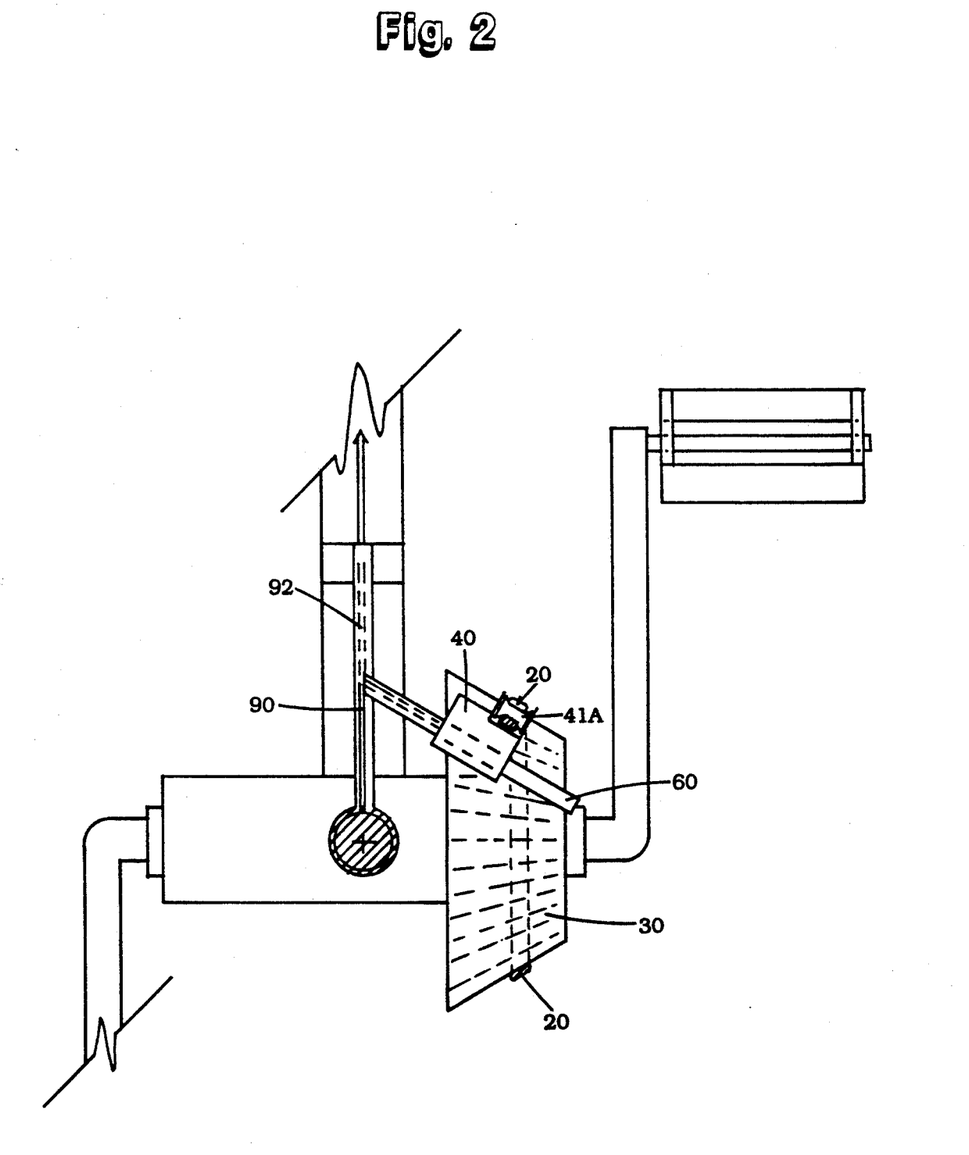
FIG. 2 shows the rear view of the pedal crank apparatus.
Figure 9:
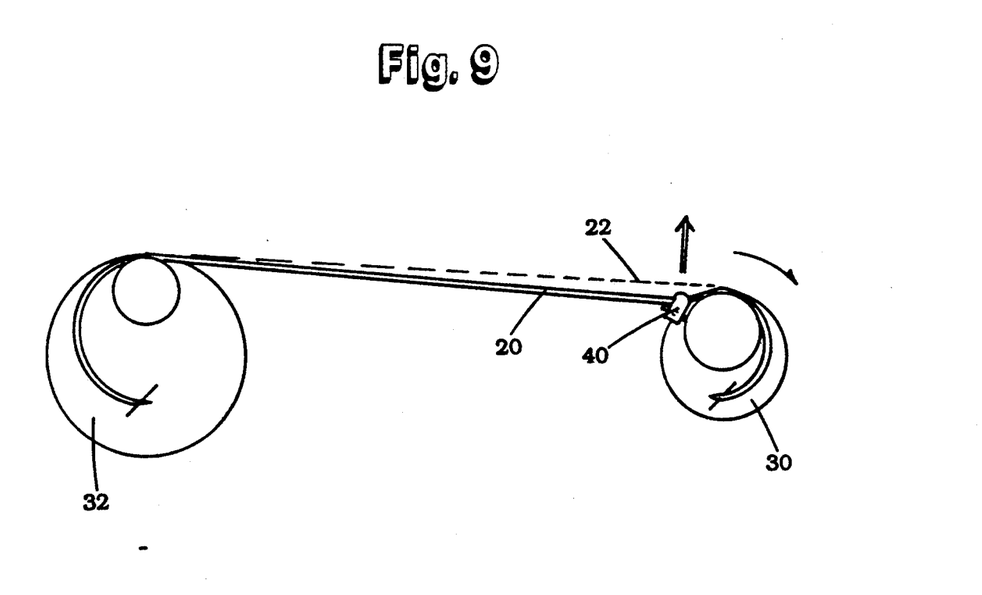
FIG. 9 shows a side view of the front and rear cones along the plane encompassing the superior-most surfaces of both cones (approx. 30 degrees).

In my invention, the pedaling pressure and pedaling speed are monitored indirectly via monitoring the forces and movements of the drive belt (20). This is accomplished by the use of the front guide's roller (41A) and its spatial relationship to the belt (20). [see FIG. 2] As the belt (20) runs through the front guide (30), its superior surface contacts only the roller (41A) inferiorly. FIG. 9 emphasizes that the point of contact between the belt (20) and the front guide roller (41A) always falls under the tangential line (22) that connects the superior surfaces of the front and rear cones (30,32). In this way, the belt (20) is bent slightly downward at its point of contact with the front roller (41A).

This feature serves two purposes. First, it creates a constant mating pressure so that the front guide (40) can retain a high level of control over the belt's (20) placement upon the front cone (30). Second, the pressure so created can be monitored, as this pressure will be directly proportional to the pedaling pressure. The force of pedaling creates a tendency for the belt (20) to straighten and to attempt to meet the tangential line (22). This upward force is exerted upon the front roller (41A) is monitored by the upward force is exerted upon the front roller (41A) and is monitored by the pressure sensor (42). In addition, we monitor pedaling speed indirectly by monitoring the front roller's (41A) speed of rotation. Both the pressure sensor (42) and the speed sensor (43) input directly into the central processing unit (44).

Just as in the home heating example, this system is in equilibrium when the rider is cruising within his/her comfort range of pedaling pressure and pedaling speed. In the state of equilibrium there is no movement of the guides (40,50) nor, therefore, any change in belt (20) placement. The gear ratio remains constant.

When the rider encounters a change in resistance, such as an uphill climb, the increased resistance tends to cause an increase in pedaling pressure and a decrease in pedaling speed. When one or both parameters fall outside their predetermined comfort ranges, the central processing unit (44) activates both the front and rear guides (40,50) simultaneously in order to compensate for the increased resistance: the front guide (40) moves outward and the rear guide (50) moves inward. The belt (20) is now being placed on a narrower portion of the front cone (30) and a wider portion of the rear cone (32). The pedal-to-rear wheel gear ratio becomes reduced and the vehicle becomes easier to pedal. Once the pedaling speed and pressure parameters return to within their comfort ranges, then equilibrium is re-established and the guides (40,50) no longer move. The rider is now happily climbing the hill at a lower gear ratio.

When the rider reaches level ground or the downslope of the hill, there is a decrease in riding resistance such that the pedaling pressure tends to decrease and the pedaling speed tends to increase. If the pedaling pressure becomes too light and/or the pedaling speed too fast, the central processing unit (44) will activate the reversible electric motors (45A,45B) to move the guides (40,50) in the opposite directions. Here, the belt (20) is placed upon a wider portion of the front cone (30) and a narrower portion of the rear cone (32). This causes the gear ratio to increase and bring the pedaling parameters back into their respective comfort ranges, thereby re-establishing equilibrium.

This system is modeled after the existing gear shifting systems of today's typical 10-speed bikes. The shape of the cones (30,32) resembles the silhouettes of the sprocket groupings as seen on 10-speed bikes. Since there are 2 sprockets on the pedal crank and 5 sprockets on the rear wheel, my invention's rear cone (32) is wider than the front cone (30) by approximately a 5:2 ratio. The guides (40,50) move synchronously and proportionally so that the rear guide (50) moves about 2.5 times as fast as the front guide (40).

Analogous to today's 10-speed bikes, there is slack created in the belt (20) when this system is functioning in the higher gear ratios. The above synchrony between the front and rear guides' movements is particularly important for proper uptake of this belt slack. By maintaining synchrony and proportionality, the changing of gear ratios is consistently and directly proportional to the amount of slack created. As described earlier, the rear guide rider bar (62) is twisted so that as the rear guide (50) moves outward along the bar (62), it simultaneously and proportionally rotates in a clockwise direction. This rotation, coupled with the space between the two rear rollers (41B,41C), allows a consistently proper uptake of belt slack by the rear guide (50). [see FIG. 7]

It is important to have control over any automated system to allow for varied riding conditions and varying rider preferences. FIG. 10 shows a hand control (70) comprising a potentiometer that is mounted on the handlebar. The potentiometer's lever (72) is similar to present gear shifters and provides a wide range of selections so that the rider may determine his/her preferred comfort range. An analog gradation is selectable whereby moving the lever (72) to the left grants a tendency for the system to remain in the lower gear ratios. Moving the lever (72) to the right grants a tendency for the system to remain in the higher gear ratios. This is accomplished by the central processing unit (44) adjusting its comfort ranges for achieving equilibrium at higher or lower pedaling pressures and pedaling speeds.

Such input from the rider may be directed to the central processing unit (44) via the hand control (70) anytime during a ride. In this way, virtually any level of riding intensity—from children or elderly to professional riders—is accommodated. Since the middle or "average" is an option and not a requisite to this invention's proper operation.

The rider should not be incapacitated upon a malfunction of the automated system. A manual override selection is available on the manual control (70) via the extreme left and right of the lever's (72) range. Activating these areas causes direct movement of the guides (40,50) for raising or lowering the gear ratio at will.

The manual control (70) also includes an On/Off switch (74). When the invention is turned off, the gear ratio simply remains constant—without any hindrance to normal riding.

CONCLUSIONS, RAMIFICATIONS, AND SCOPE OF INVENTION

The reader will see that the drive system of the invention provides superior efficiency to bicycle riders. The invention is surprisingly simple, yet provides an infinite number of gear ratios within a range comparable to today's 10-speed bicycles.

The invention does not require conscious rider input for proper function. However, the option for the rider to input personal preference is available whereby any age or riding skill level can be accommodated.

Weight is an important consideration to serious cyclists. This invention is primarily comprised of plastic parts, and is therefore much lighter than comparable all-metal systems. Also, since the structure of my invention is relatively independent of the frame of the bicycle, applicability to today's bicycle frames is very high. In addition, this invention dissipates very little of the rider's energy during use. Finally, it's overall simplicity minimizes production costs.

While the above description contains many specificities, these should not be construed as limitations on the scope of this invention, but rather as an exemplification of one preferred embodiment thereof. Many other variations are possible. For example, the belt guides may be moved via hydraulic tracking means; the central processing unit may be located on the bicycle frame instead of within the front guide; a torque/pressure sensor could interface between the pedal crank and the front cone—or between the rear wheel and the rear cone—in order to monitor pedaling pressure directly; a speed sensor could be mounted so as to measure pedaling speed directly from the pedal crank, the front cone, or the rear cone; the manual control could contain a sliding-type switch instead of a rotating potentiometer; the shapes, widths, and angles of the drive cones could vary considerably; the drive belt may be plastic or rubber, with various reinforcing materials; the cross-section of the drive belt can take on many shapes; etc.

Accordingly, the scope of the invention should be determined not by the embodiment illustrated, but by the appended claims and their legal equivalents.

I claim:
1. A propulsion system for human powered vehicles comprising:
   a) a pedal mechanism,
   b) an elongated, endless and looped material for coupling rotational energy from said pedal mechanism to a rear wheel of said human powered vehicle,
   c) a smooth cone shaped surface affixed to said rear wheel for contacting and gripping said looped material,
   d) a guide mechanism including a rolling apparatus for selectively placing said looped material upon locations of varying diameter on said smooth cone shaped surface,
   e) an elongated guide rider bar located proximal to the undersurface of said smooth cone shaped surface and providing tracking means for said guide mechanism to move perpendicularly to said looped material, and f) a placement means for moving said guide mechanism along the long axis of said guide rider bar.

2. The propulsion system of claim 1, wherein said looped material comprises a smooth and flat flexible belt.

3. The propulsion system of claim 1, further including an electric motor for powering said placement means.

4. The propulsion system of claim 3, further including a power cell for providing electricity to said electric motor.

5. The propulsion system of claim 4, further including a generator means structurally linking said rolling apparatus to said power cell, whereby recharging electricity is provided to the power cell during pedaling.

6. The propulsion system of claim 3, wherein said electric motor is reversible.

7. The propulsion system of claim 4, further including automation means for controlling said electric motor in response to changing riding conditions encountered by the human powered vehicle.

8. The propulsion system of claim 7, wherein said automation means comprises a sensing means for monitoring pedaling motion and/or pedaling pressure, and a central processing unit for inputing the pedaling information from said sensing means and outputing a command to said electric motor.

9. The propulsion system of claim 8, further including a manual control means for providing human cognitive input to said central processing unit, whereby the operation of said automation means can be influenced by individual rider preferences.

10. The propulsion system of claim 9, wherein said manual control further includes manual override capabilities and an on/off switch.

11. A propulsion system for human powered vehicles comprising:
a) a pedal mechanism,
b) an elongated, endless and looped material for coupling rotational energy from said pedal mechanism to a rear wheel of said human powered vehicle,
c) a cone shaped surface affixed to said pedal mechanism for contacting and gripping said looped material,
d) a guide mechanism including a rolling apparatus for selectively placing said looped material upon locations of varying diameter on said cone shaped surface,
e) an elongated guide rider bar located proximal to the uppersurface of said cone shaped surface and providing tracking means for said guide mechanism to move perpendicularly to said looped material, and
f) a placement means for moving said guide mechanism along the long axis of said guide rider bar.

12. The propulsion system of claim 11, wherein said looped material comprises a flexible belt.

13. The propulsion system of claim 11, further including an electric motor for powering said placement means.

14. The propulsion system of claim 13, further including a power cell for providing electricity to said electric motor.

15. The propulsion system of claim 14, further including a generator means structurally linking said rolling apparatus to said power cell, whereby recharging electricity is provided to the power cell during pedaling.

16. The propulsion system of claim 13, wherein said electric motor is reversible.

17. The propulsion system of claim 14, further including automation means for controlling said electric motor in response to changing riding conditions encountered by the human powered vehicle.

18. The propulsion system of claim 17, wherein said automation means comprises a sensing means for monitoring pedaling motion and/or pedaling pressure, and a central processing unit for inputing the pedaling information from said sensing means and outputing a command to said electric motor.

19. The propulsion system of claim 18, further including a manual control means for providing human cognitive input to said central processing unit, whereby the operation of said automation means can be influenced by individual rider preferences.

20. The propulsion system of claim 19, wherein said manual control further includes manual override capabilities and an on/off switch.

* * * * *